(12) United States Patent
Ciampa et al.

(10) Patent No.: US 9,937,575 B2
(45) Date of Patent: Apr. 10, 2018

(54) BRAZED JOINTS AND METHODS OF FORMING BRAZED JOINTS

(71) Applicant: UNITED TECHNOLOGIES CORPORATION, Farmington, CT (US)

(72) Inventors: Thomas Ciampa, York, ME (US); Matthew S. Verbiscus, Dover, NH (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 291 days.

(21) Appl. No.: 14/614,636

(22) Filed: Feb. 5, 2015

(65) Prior Publication Data

US 2016/0228965 A1    Aug. 11, 2016

(51) Int. Cl.
*B23K 1/00*          (2006.01)
*B23K 33/00*        (2006.01)
(Continued)

(52) U.S. Cl.
CPC .............. *B23K 1/00* (2013.01); *B23K 1/0018* (2013.01); *B23K 1/14* (2013.01); *B23K 1/20* (2013.01);
(Continued)

(58) Field of Classification Search
CPC ........ B23K 1/00; B23K 33/00; B23K 33/004; B23K 3/025; B23K 3/0623; Y10T 403/479; Y10T 29/49968
(Continued)

(56) References Cited

U.S. PATENT DOCUMENTS 4,780,160 A * 10/1988 Kipp ..................... C04B 35/111
                                                                   156/153
5,591,359 A *  1/1997 Saitou ................. B23K 15/006
                                                                   148/525
(Continued)

FOREIGN PATENT DOCUMENTS

EP           3053689 A1 *  8/2016 ........... B23K 1/0018
FR           977750 A       4/1951
(Continued)

OTHER PUBLICATIONS

Katrina C. Arabe, Welding Vs. Brazing, 1 page, Jan. 18, 2005, found online at http://news.thomasnet.com/imt/2005/01/18/welding_vs_braz with google search.*
(Continued)

*Primary Examiner* — Robert Canfield
(74) *Attorney, Agent, or Firm* — Cantor Colburn LLP

(57) ABSTRACT

A method for forming a brazed joint between a first part having a first surface and a second part having a second surface may comprise applying at least two beads of braze filler at either of the first surface and the second surface, and assembling the first surface and the second surface to define a shiplap interface therebetween. The shiplap interface may terminate at a first terminus and a second terminus, and may include a first cavity and a second cavity. One of the beads of braze filler may be localized at the first cavity and the other may be localized at the second cavity. The method may further comprise melting each of the beads of braze filler to a braze liquid, and allowing the braze liquid to flow through the shiplap interface from the first cavity towards the first terminus, and from the second cavity towards the second terminus.

16 Claims, 4 Drawing Sheets

(51) Int. Cl.
*B23K 1/14* (2006.01)
*B23K 1/20* (2006.01)
*B23K 101/00* (2006.01)
*B23K 103/08* (2006.01)

(52) U.S. Cl.
CPC ............ B23K 33/00 (2013.01); B23K 33/004 (2013.01); *B23K 2201/001* (2013.01); *B23K 2203/08* (2013.01); *Y10T 403/479* (2015.01)

(58) Field of Classification Search
USPC ...................................................... 156/304.5
See application file for complete search history.

(56) References Cited

U.S. PATENT DOCUMENTS

| | | | |
|---|---|---|---|
| 6,581,438 | B1 | 6/2003 | Hall et al. |
| 6,638,383 | B2 * | 10/2003 | Tarnawskyj ............ B29C 65/56 156/157 |
| 2003/0038165 | A1 * | 2/2003 | Polvi .................... B23K 1/0016 228/193 |
| 2005/0037225 | A1 * | 2/2005 | Rajabali .................. B29C 66/14 428/600 |
| 2005/0127044 | A1 * | 6/2005 | Nozue .................... B23K 11/02 219/78.02 |
| 2009/0255117 | A1 * | 10/2009 | Hovel .................. B23K 1/0018 29/889.1 |
| 2010/0119371 | A1 * | 5/2010 | Heinz-Schwarzmaier ...... F01D 11/005 416/182 |
| 2012/0058360 | A1 * | 3/2012 | Oda ........................ B23K 20/02 428/600 |
| 2013/0011185 | A1 * | 1/2013 | Chaumat ............... B23K 1/0008 403/272 |
| 2014/0016993 | A1 * | 1/2014 | Itoh ......................... B32B 37/18 403/270 |
| 2014/0248140 | A1 | 11/2014 | Jasques et al. |
| 2014/0341635 | A1 * | 11/2014 | Lemke ................. B23K 1/0008 403/14 |

FOREIGN PATENT DOCUMENTS

| | | | | |
|---|---|---|---|---|
| JP | 5564962 | A | | 5/1980 |
| JP | 01150524 | A | * 6/1989 | ......... B29C 65/4835 |
| JP | 11348836 | A | | 12/1999 |

OTHER PUBLICATIONS

Majid Pouranvari, Diffusion Brazing of a Nickel Based Superalloy Part 1—Solidification Behavior, 7 page scientific paper UDC: 621.792.3:669.248, pp. 241-247 of MJoM vol. 16(4) 2010.*

European Search Report and Communication; Application No. 16154452.3-1702; dated Jul. 1, 2016; 8 pages.

* cited by examiner

BRAZED JOINTS AND METHODS OF FORMING BRAZED JOINTS

FIELD OF THE DISCLOSURE

The present disclosure generally relates to components having brazed joints, and more specifically, to components having brazed joints at geometrically complex interfaces and methods of forming such brazed joints.

BACKGROUND

Brazing is a common method for joining metallic parts. Brazing involves applying a braze filler material, such as a braze paste or a braze foil, at an interface between two closely fitting parts, followed by heating of the braze filler to a temperature sufficient to cause the braze filler to form a braze liquid. The braze liquid may then distribute across the interface and wet the interface by capillary action. In some cases, the braze filler may be applied at one side of the interface and may be permitted to flow through the interface when melted. In such an arrangement, completion of wetting of the interface with the braze liquid may be confirmed by observation of the braze liquid at the other side of the interface. When suitably distributed across the interface, the braze filler liquid may then be cooled and hardened to provide a brazed joint between the two parts.

While effective, the formation of brazed joints is often limited to flat or straight connection interfaces between parts, as corners/sharp turns in the braze liquid flow path may interrupt the capillary movement of the braze liquid. The interruption of braze flow may ultimately hinder complete wetting of the interface between the parts, possibly leading to weak joints susceptible to failure during operation. Thus, joints with complex geometrical interfaces, such as shiplap joints, are currently a challenge to access by standard brazing techniques. However, shiplap joints are desirable in many applications as such joints have improved shear strengths relative to joints with flat connection interfaces. For example, U.S. Patent Application Publication Number US 2014/0248140 discloses the use of shiplap joints between stator elements of a stator assembly to provide a strong seal that counters gas loads on the stator vanes. Although the benefits of shiplap joints are well-recognized, workable methods for forming brazed joints at shiplap interfaces are still wanting.

Clearly, there is a need for strategies for providing brazed joints at complex geometrical interfaces, such as shiplap interfaces.

SUMMARY

In accordance with one aspect of the present disclosure, a component is disclosed. The component may comprise a first part having a first surface, a second part having a second surface, and at least one shiplap interface formed between the first surface and the second surface. The shiplap interface may have a first corner and a second corner, as well as a first cavity located at the first corner and a second cavity located at the second corner. In addition, the component may further comprise a brazed joint in the shiplap interface that joins the first part and the second part.

In another refinement, the first cavity may be defined between an outwardly-extending corner of the first surface and an inwardly-extending corner of the second surface, and the second cavity may be defined between an outwardly-extending corner of the second surface and an inwardly-extending corner of the first surface.

In another refinement, the outwardly-extending corner of the first surface may include a first chamfer, and the outwardly-extending corner of the second surface may include a second chamfer.

In another refinement, the first cavity may be defined between the first chamfer of the first surface and the inwardly-extending corner of the second surface, and the second cavity may be defined between the second chamfer of the second surface and the inwardly-extending corner of the first surface.

In another refinement, the shiplap interface may include a first terminus and a second terminus, and the brazed joint may be formed by applying a bead of braze filler at each of the first cavity and the second cavity, melting the beads of braze filler to a braze liquid, and allowing the braze liquid to flow outward from the first cavity and the second cavity towards the first terminus and the second terminus, respectively.

In another refinement, the flow of the braze liquid from the first cavity and the second cavity towards the first terminus and the second terminus, respectively, may be visible at the first terminus and the second terminus and may allow for inspection of braze completeness.

In another refinement, the braze liquid may form a brittle material upon cooling and hardening, and the brittle material may be contained within the shiplap interface at the first cavity and the second cavity.

In another refinement, the shiplap interface may further include a flat region between the first cavity and the second cavity, and a braze foil may be placed at the flat region prior to forming the brazed joint.

In another refinement, the first part and the second part may each be formed from a nickel alloy.

In another refinement, the component may be part of a stator assembly of a gas turbine engine.

In another refinement, the shiplap interface may be a male-female connection interface.

In accordance with another aspect of the present disclosure, a method for forming a brazed joint between a first part having a first surface and a second part having a second surface is disclosed. The method may comprise applying at least two beads of braze filler at either of the first surface and the second surface, and assembling the first part and the second part to define a shiplap interface therebetween. The shiplap interface may terminate at a first terminus and a second terminus, and may include a first corner and a second corner. In addition, the shiplap interface may have a first cavity located at the first corner and a second cavity located at the second corner. One of the two beads of braze filler may be localized at the first cavity and the other may be localized at the second cavity. The method may further comprise melting each of the beads of braze filler to a braze liquid, and allowing the braze liquid to flow through the shiplap interface from the first cavity towards the first terminus, and from the second cavity towards the second terminus. The method may further comprise allowing the braze liquid to cool and harden to provide a brazed joint between the first part and the second part.

In another refinement, the first surface may include an inwardly-extending corner and an outwardly-extending corner having a first chamfer, the second surface may include an inwardly-extending corner and an outwardly-extending corner having a second chamfer, and applying the at least two beads of braze filler at either of the first surface and the second surface may include applying a bead of braze filler to each of the first chamfer and the second chamfer.

In another refinement, assembling the first surface and the second surface to define the shiplap interface therebetween may comprise forming the first cavity between the first chamfer and the inwardly-extending corner of the second surface, and forming the second cavity between the second chamfer and the inwardly-extending corner of the first surface.

In another refinement, the method may further comprise inspecting braze completeness by monitoring the flow of the braze liquid from the first cavity and the second cavity to the first terminus and the second terminus, respectively.

In another refinement, the method may further comprise applying a braze foil to a flat region of the shiplap interface located between the first cavity and the second cavity prior to melting each of the beads of braze filler to a braze liquid.

In another refinement, melting of each of the beads of braze filler to a braze liquid may further comprise melting the braze foil to a braze liquid.

In another refinement, allowing the braze liquid to cool and harden may further comprise allowing the braze liquid to form a brittle material buried in the shiplap interface and localized at the first cavity and the second cavity.

In accordance with another aspect of the present disclosure, a method for forming a brazed joint between a first part having a first surface and a second part having a second surface is disclosed. The first surface may include an inwardly-extending corner and an outwardly-extending corner having a first chamfer, and the second surface may include an inwardly-extending corner and an outwardly-extending corner having a second chamfer. The method may comprise applying a bead of braze filler at each of the first chamfer and the second chamfer, and assembling the first surface and the second surface to define a shiplap interface therebetween. The shiplap interface may include a first terminus, a second terminus, a first cavity defined between the first chamfer of the first surface and the inwardly-extending corner of the second surface, and a second cavity defined between the second chamfer of the second surface and the inwardly-extending corner of the first surface. The method may further comprise melting each of the beads of braze filler to a braze liquid, and allowing the braze liquid to flow through the shiplap interface from the first cavity towards the first terminus, and from the second cavity towards the second terminus. In addition, the method may further comprise allowing the braze liquid to cool and harden to provide a brazed joint between the first part and the second part.

In another refinement, the method may further comprise inspecting braze completeness by monitoring the flow of the braze liquid from the first cavity and the second cavity to the first terminus and the second terminus, respectively.

These and other aspects and features of the present disclosure will be more readily understood when read in conjunction with the accompanying drawings.

It should be understood that the drawings are not necessarily drawn to scale and that the disclosed embodiments are sometimes illustrated schematically and in partial views. It is to be further appreciated that the following detailed description is merely exemplary in nature and is not intended to limit the disclosure or the application and uses thereof. In this regard, it is to be additionally appreciated that the described embodiments are not limited to use with the exemplary gas turbine engine stator assemblies described herein. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
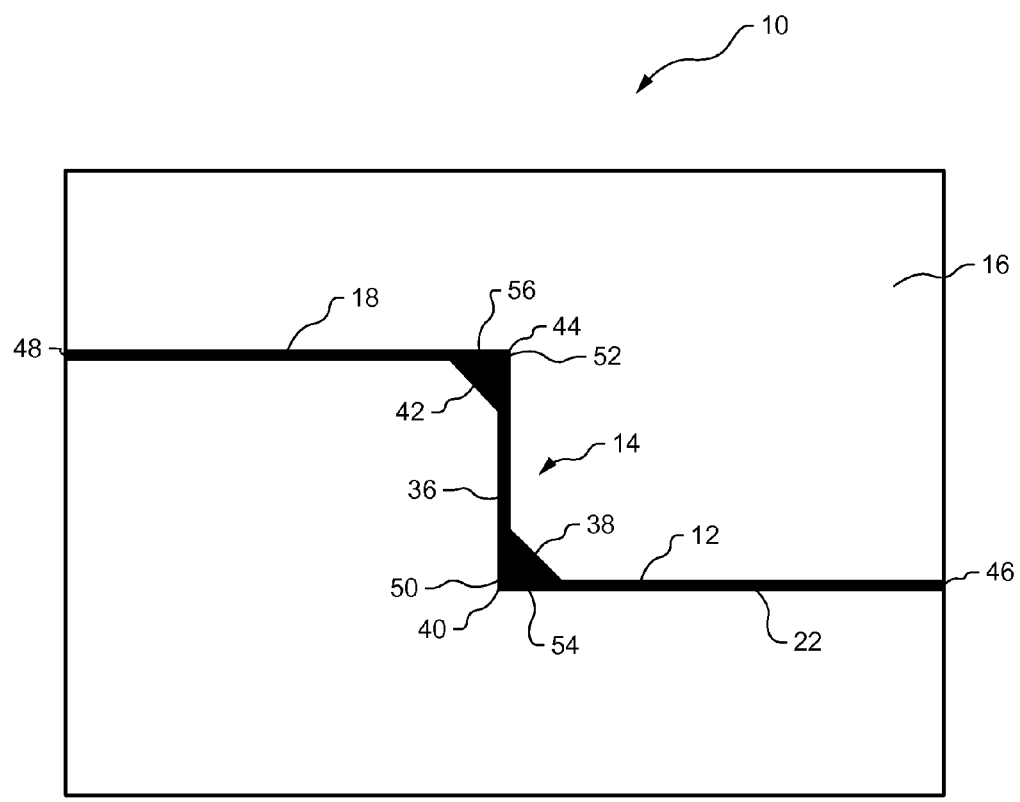
FIG. 1 is a schematic representation of a component having a brazed joint at a shiplap interface, constructed in accordance with the present disclosure.
Figure 2:
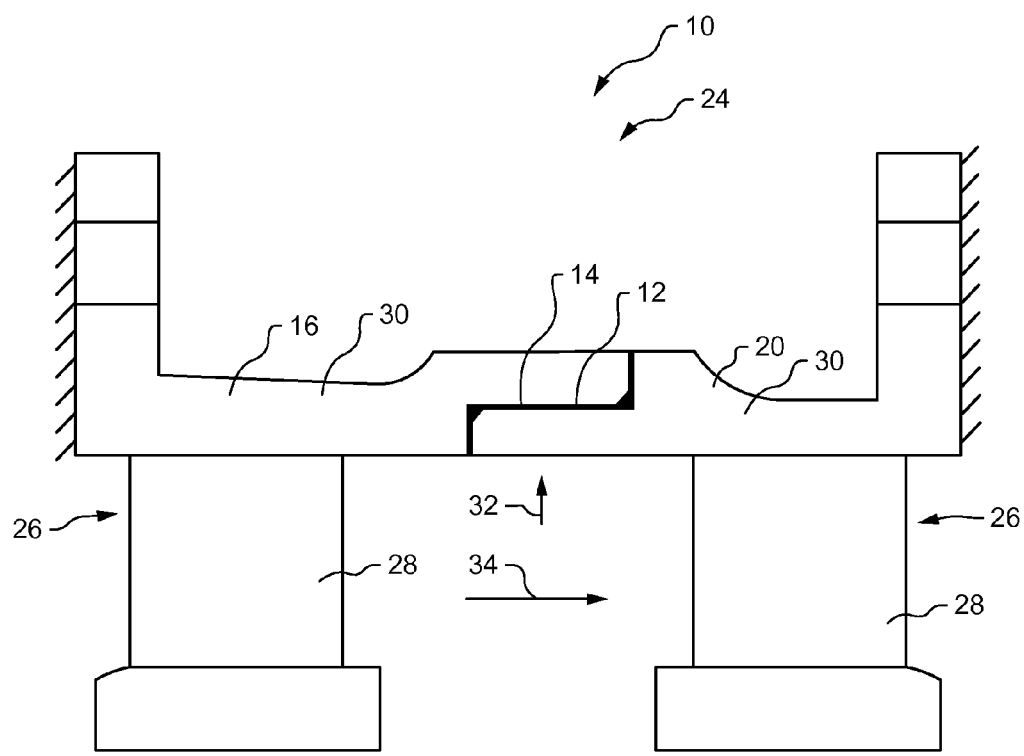
FIG. 2 is a schematic representation of a stator assembly having a brazed joint at a shiplap interface between two stator elements, constructed in accordance with the present disclosure.

Referring now to the drawings, and with specific reference to FIG. 1, an exemplary component 10 having a brazed joint 12 at a shiplap interface 14 is shown. The component 10 may include a first part 16 have a first surface 18 and a second part 20 having a second surface 22 (also see FIG. 5), wherein the first surface 18 is assembled with the second surface 22 to form the shiplap interface 14 therebetween. As brazed shiplap joints may have greater shear strengths and improved strengths in the radial direction compared with brazed joints formed at flat interfaces, the brazed joint 12 at the shiplap interface 14 may provide advantages in numerous applications such as, but not limited to, gas turbine engine applications. For example, as shown in FIG. 2, the component 10 may be part of a stator assembly 24 of a gas turbine engine, the function of which will be well understood by those skilled in the art. In this example, the first part 16 and the second part 20 may be stator elements 26 each including an airfoil 28 and a platform 30. The brazed joint 12 at the shiplap interface 14 may advantageously counteract a radial gas load 32 in the gas path 34 and improve performance. Moreover, the brazed joint 12 may be lighter in weight than a bolted arrangement, leading to potential improvements in engine efficiency. In addition, the brazed joint 12 may provide a viable alternative to welded joints in situations where the stator elements 26 are formed from materials that are difficult to weld, such as nickel super alloy materials used in higher temperature applications. It will be understood, however, that applications of the brazed joint 12 at the shiplap interface 14 disclosed herein may extend well beyond the context of gas turbine engines.

Referring back to FIG. 1, the details of the shiplap interface 14 are described in more detail. Specifically, the shiplap interface 14 may include one or more steps 36 each formed by assembling an outwardly-extending corner 38 of the first surface 18 with an inwardly-extending corner 40 of the second surface 22, and by assembling an outwardly-extending corner 42 of the second surface 22 with an inwardly-extending corner 44 of the first surface 18 (also see FIG. 5). Furthermore, the shiplap interface 14 may include a first terminus 46, a second terminus 48, as well as a first corner 50 at a junction between the outwardly-extending corner 38 of the first surface 18 and the inwardly-extending corner 40 of the second surface 22, and a second corner 52 at a junction between the outwardly-extending corner 42 of the second surface 22 and the inwardly-extending corner 44 of the first surface 18. The first corner 50 and the second corner 52 of the shiplap interface 14 may or may not be at 90° angles.

In addition, the shiplap interface 14 may include a first cavity 54 at the first corner 50, and a second cavity 56 at the second corner 52. Notably, the first cavity 54 and the second cavity 56 may provide locations for application of a braze filler during formation of the brazed joint 12 (see further details below). In particular, application of the braze filler at the first cavity 54 and the second cavity 56 allows the melted braze filler to flow outward towards the first terminus 46 and the second terminus 48, respectively. Thus, the cavities 54 and 56 may allow the braze filler to avoid flowing through the corners 50 and 52, so as to prevent disruption of the braze capillary motion which would otherwise occur if the braze filler were applied at one of the termini 46 or 48 and allowed to flow into the shiplap interface 14. Thus, even wetting of the surfaces 18 and 22 with the braze filler may be achieved. As one possibility, the first cavity 54 may be formed between a first chamfer 58 on the outwardly-extending corner 38 of the first surface 18 and the inwardly-extending corner 40 of the second surface 22, while the second cavity 56 may be formed between a second chamfer 60 of the outwardly-extending corner 42 of the second surface 22 and the inwardly-extending corner 44 on the first surface 18, as shown (also see FIG. 5). However, the cavities 54 and 56 may be formed in other ways as well.

It is also noted that the shiplap interface 14 may have a more complex geometry than that shown in FIG. 1. For example, it may have multiple steps 36 distributed across the interface 14, such as in a male-female connection interface 62 (see FIG. 3). It will be understood that the arrangements of the cavities 54 and 56 described above may apply to each of the steps 36 of such interfaces.

Figure 4:
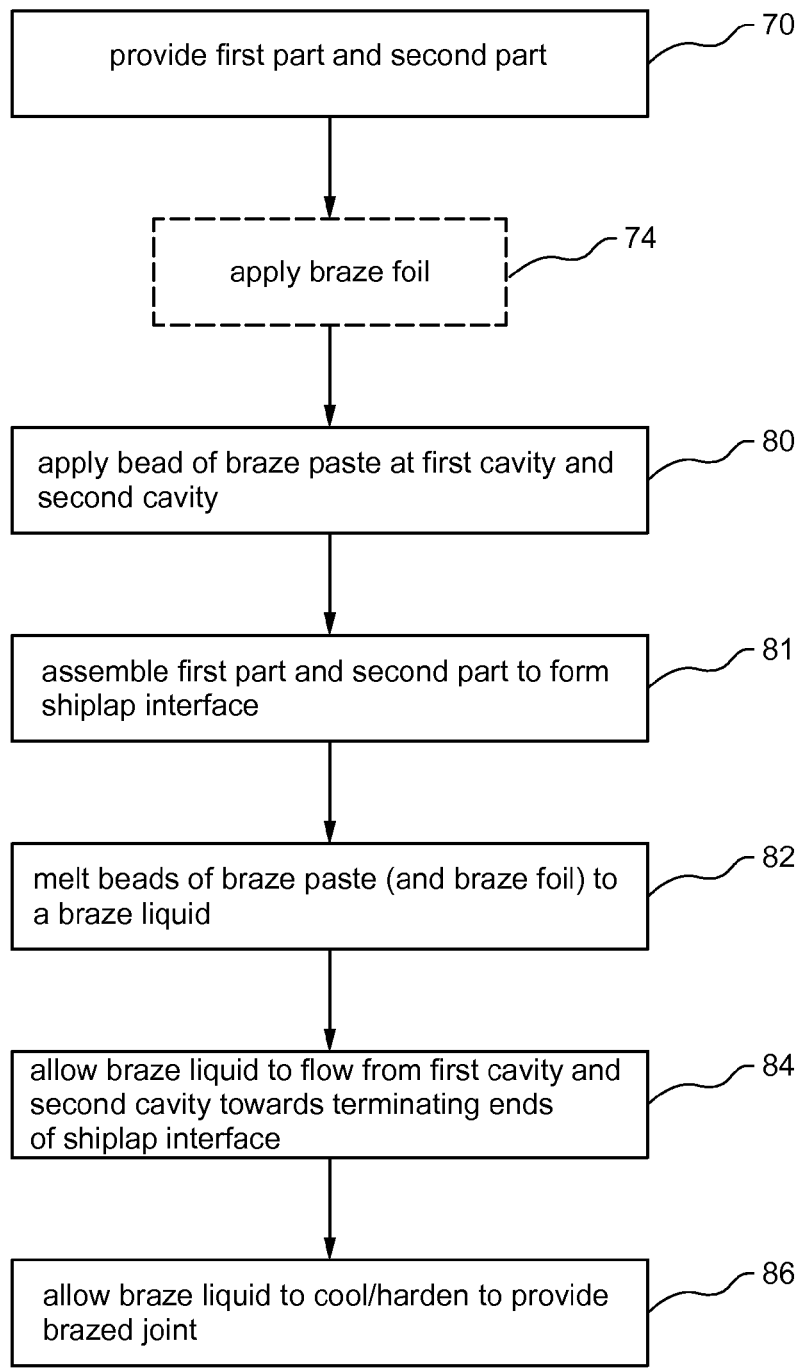
FIG. 4 is a flowchart illustrating a sample sequence of steps which may be involved in forming a brazed joint at a shiplap interface between two parts, in accordance with a method of the present disclosure.
Figures 5, 6:
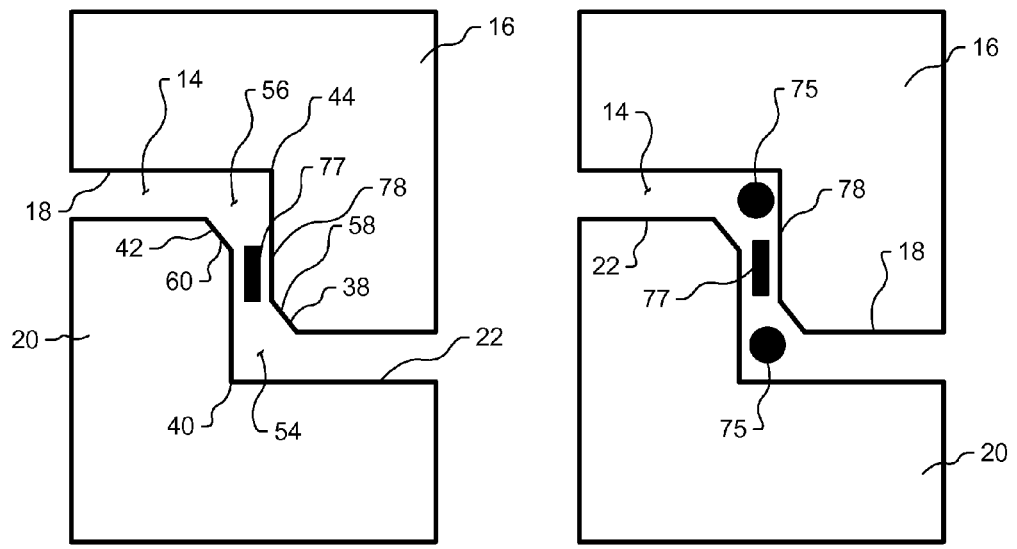
FIG. 5 is a schematic representation of assembling a first part and a second part to form a shiplap interface therebetween, in accordance with the method of FIG. 4.
FIG. 6 is a schematic representation of applying a bead of braze filler at a first cavity and a second cavity of the shiplap interface of FIG. 5, in accordance with the method of FIG. 4.
Figure 7:
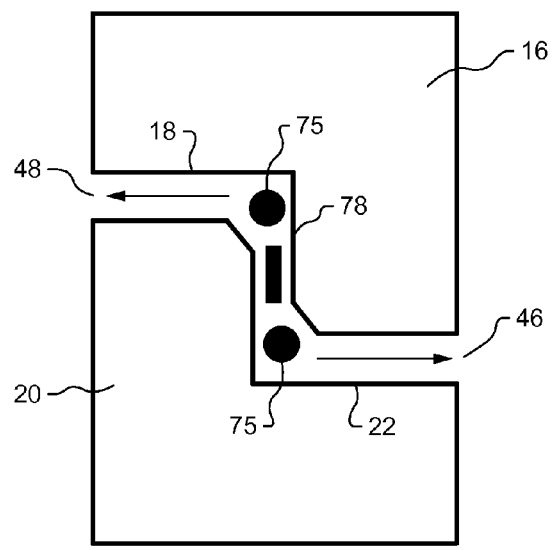
FIG. 7 is a schematic representation of allowing the beads of braze filler to flow outward from the first cavity and the second cavity towards the termini of the shiplap interface, in accordance with the method of FIG. 4.

Turning now to FIGS. 4-7, a method for fabricating the component 10 having the brazed joint 12 at the shiplap interface 14 in accordance with the present disclosure is shown in flowchart form in FIG. 4 and schematically in FIGS. 5-7. It is noted that the space between the surfaces 18 and 22 that define the shiplap interface 14 are exaggerated for illustration purposes in FIGS. 5-7. Beginning with a block 70, the first part 16 and the second part 20 may be provided. Optionally, a braze foil 77, or another type of braze filler, may be applied at a flat region 78 between the cavities 54 and 56 according to an optional block 74 (see FIG. 5). The braze foil 77 may have adhesive properties such that it adheres to the flat region 78. According to a next block 80, a bead of braze filler 75 (e.g., a braze paste) may be applied at each of the cavities 54 and 56 (e.g., at either of the inwardly-extending corners 40 and 44 or at either of the chamfers 58 and 60) (see FIG. 6). The braze filler may be any suitable type of braze filler, such as, but not limited to, a gold-nickel-palladium filler if the parts 16 and 20 are formed from a nickel super alloy. It will be understood that the blocks 74 and 80 may be performed in any order. Furthermore, the parts 16 and 20 may be assembled to form the shiplap interface 14 therebetween (block 81). Specifically, the first surface 18 and the second surface 20 may be assembled to define the first cavity 54 between the first chamfer 58 of the first surface 18 and the inwardly-extending corner 40 of the second surface 22, as well as to define the second cavity 56 between the second chamfer 60 of the second surface 22 and the inwardly-extending corner 44 of the first surface 18.

According to a next block 82, the beads of braze filler 75 may then be heated to a temperature sufficient to melt the beads of braze filler (as well as to melt the braze foil 77 if present) to a braze liquid. The braze liquid may then be allowed to flow outward from the first cavity 54 towards the first terminus 46, and to flow outward from the second cavity 56 towards the second terminus 48 according to a next block 84 (see FIG. 7). The application of the beads of braze filler 75 at the cavities 54 and 56 permits the braze liquid to flow through the shiplap interface 14 by capillary action without interruption at the corners 50 and 52 as would otherwise occur if the bead of braze filler were applied at either of the termini 46 or 48 and allowed to flow into the shiplap interface 14. In addition, the beads of braze filler 75 and/or the braze foil 77 may also flow and wet the flat region 78 by capillary action when melted to a braze liquid. Thus, the surfaces of the shiplap interface 14 may be evenly wetted with the braze liquid according to the method of the present disclosure. In addition, the flow of the braze liquid from the cavities 54 and 56 to the termini 46 and 48 may be visible at the termini 46 and 48, allowing for the visual inspection and confirmation of braze flow completion (see FIG. 7). Such inspection of braze flow completion at shiplap interfaces has been hindered in prior art systems by the disruption of capillary flow at the corners of the interface. Generally, the visual inspection of braze completeness may be performed after the braze liquid has cooled and hardened, as the parts 16 and 20 may be brazed at high temperatures (e.g., 900° F. or more).

Once the shiplap interface 14 is suitably wetted with the braze liquid, the braze liquid may be permitted to cool and harden to provide the brazed joint 12 between the parts 16 and 20 (block 86). Notably, upon cooling and hardening, the braze liquid may form an excess brittle material localized at the cavities 54 and 56 (or the starting point of braze flow) and contained in the shiplap interface 14. Thus, the excess brittle material may not interfere with operation or pose a damage risk in the presence of foreign objects. This is yet another advantage of the present disclosure over prior art systems which apply the braze filler at the outside of a joint interface and allow the braze liquid to flow into the interface, as the excess brittle material (at the starting point of braze flow) is localized outside of the joint and may pose a risk during operation. Unlike such prior art systems which require the chipping off or removal of excess brittle material, any excess brittle material formed by the method of the present disclosure may be left in place since it is contained in the shiplap interface 14, thereby reducing or eliminating risks of foreign object damage.

Figure 3:
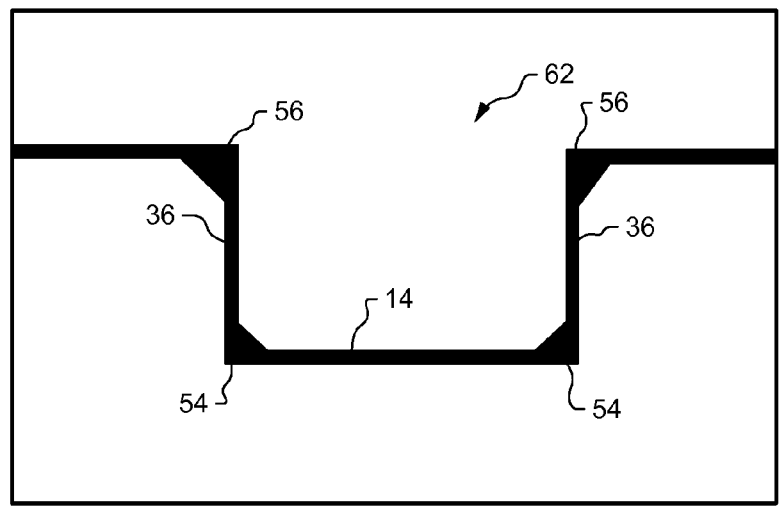
FIG. 3 is a schematic representation of a component having a brazed joint at a male-female connection interface, constructed in accordance with the present disclosure.

Although the method of forming the brazed joint 12 at the shiplap interface 14 disclosed herein is focused on a shiplap joint with a single step, it will be understood that the method may be extended to more complex shiplap interfaces having multiple steps such as, but not limited to, the male-female connection interface 62 shown in FIG. 3.

INDUSTRIAL APPLICABILITY

In general, it can therefore be seen that the technology disclosed herein has industrial applicability in a variety of settings including, but not limited to, applications requiring components having brazed joints at complex geometrical interfaces, such as interfaces with a step design (i.e., shiplap interfaces). One non-limiting example would be in the manufacture of gas turbine engine components, although a myriad of other applications exist as well. Brazed joints of prior art systems are generally limited to flat or straight interface geometries, as the capillary flow of braze liquid is hindered by sharp turns or corners in the braze flow path. As a result, it remains a challenge to provide suitable brazed joints at shiplap interfaces. The technology disclosed herein provides access to strong brazed joints at shiplap interfaces by incorporating cavities at the corners of the shiplap interfaces. As disclosed herein, beads of braze filler may be applied to the cavities of the shiplap interface such that the braze filler may flow outward from the cavities when melted, essentially bypassing the corners in the flow path. This allows for even wetting of the shiplap interface surfaces with the braze liquid, such that a strong joint may be formed upon cooling. In addition, since the flow of the braze liquid is not disrupted by the corners, braze flow completeness may be visually inspected at the termini of the shiplap interface to ensure proper braze coverage across the shiplap interface. As shiplap joints may provide improved shear strengths and increased strengths in the radial direction compared with brazed joints formed at flat interfaces, the brazed shiplap joints disclosed herein may have numerous applications. For example, the brazed shiplap joints disclosed herein may replace heavier bolted designs in gas turbine engines to provide improvements in fuel efficiency. In addition, brazed shiplap joints may be used in place of welded shiplap joints between parts that are difficult to weld (e.g., nickel super alloy parts). It is expected that the technology disclosed herein may find wide industrial applicability in a wide range of areas such as, but not limited to, aerospace and automotive applications, power generation applications, and construction applications.

What is claimed is:

1. A component, comprising:
   a first part having a first surface;
   a second part having a second surface;
   at least one shiplap interface formed between the first surface and the second surface, the shiplap interface having a first corner and a second corner, the shiplap interface including a first cavity located at the first corner and a second cavity located at the second corner; and
   a brazed joint in the shiplap interface and joining the first part and the second part,
   wherein the first cavity is defined between an outwardly-extending corner of the first surface and an inwardly-extending corner of the second surface, and wherein the second cavity is defined between an outwardly-extending corner of the second surface and an inwardly-extending corner of the first surface,
   wherein the outwardly-extending corner of the first surface includes a first chamfer, and wherein the outwardly-extending corner of the second surface includes a second chamfer,
   wherein the first cavity is defined between the first chamfer of the first surface and the inwardly-extending corner of the second surface, and wherein the second cavity is defined between the second chamfer of the second surface and the inwardly-extending corner of the first surface, and
   wherein the shiplap interface includes a first terminus and a second terminus, both of which are located away from the first and second cavities and wherein the brazed joint is formed by applying a bead of a braze filler at each of the first cavity and the second cavity, melting the beads of braze filler to a braze liquid, and allowing the braze liquid to flow outward from the first cavity and the second cavity towards the first terminus and the second terminus, respectively.

2. The component of claim 1, wherein the flow of the braze liquid from the first cavity and the second cavity towards the first terminus and the second terminus, respectively, is visible at the first terminus and the second terminus and allows for inspection of braze completeness.

3. The component of claim 1, wherein excess braze liquid is contained within the shiplap interface at the first cavity and the second cavity.

4. The component of claim 1, wherein the shiplap interface further includes a flat region between the first cavity and the second cavity, and wherein a braze foil is placed at the flat region prior to forming the brazed joint.

5. The component of claim 1, wherein the first part and the second part are each formed from a nickel super alloy.

6. The component of claim 1, wherein the component is a part of a stator assembly of a gas turbine engine.

7. The component of claim 1, wherein the shiplap interface is a male-female connection interface.

8. A method for forming a brazed joint between a first part having a first surface and a second part having a second surface, comprising:
   applying at least two beads of braze filler at either of the first surface and the second surface;
   assembling the first surface and the second surface to define a shiplap interface therebetween, the shiplap interface terminating at a first terminus and a second terminus and including a first corner and a second corner located away from both termini, the shiplap interface having a first cavity located at the first corner and a second cavity located at the second corner, one of the two beads of braze filler being localized at the first cavity and the other being localized at the second cavity;
   melting each of the beads of braze filler to a braze liquid;
   allowing the braze liquid to flow through the shiplap interface from the first cavity towards the first terminus, and from the second cavity towards the second terminus; and
   allowing the braze liquid to cool and harden to provide a brazed joint between the first part and the second part.

9. The method of claim 8, wherein the first surface includes an inwardly-extending corner and an outwardly-extending corner having a first chamfer, wherein the second surface includes an inwardly-extending corner and an outwardly-extending corner having a second chamfer, and wherein applying the at least two beads of braze filler at either of the first surface and the second surface includes applying a bead of braze filler to each of the first chamfer and the second chamfer.

10. The method of claim 9, wherein assembling the first surface and the second surface to define the shiplap interface therebetween comprises forming the first cavity between the first chamfer and the inwardly-extending corner of the second surface, and forming the second cavity between the second chamfer and the inwardly-extending corner of the first surface.

11. The method of claim 8, further comprising inspecting braze completeness by monitoring the flow of the braze liquid from the first cavity and the second cavity to the first terminus and the second terminus, respectively.

12. The method of claim 1, further comprising applying a braze foil to a flat region of the shiplap interface located between the first cavity and the second cavity prior to melting each of the beads of braze filler to a braze liquid.

13. The method of claim 12, wherein melting each of the beads of braze filler to a braze liquid further comprises melting the braze foil to a braze liquid.

14. The method of claim 1, wherein allowing the braze liquid to cool and harden further comprises allowing the braze liquid to form a brittle material buried in the shiplap interface and localized at the first cavity and the second cavity.

15. A method for forming a brazed joint between a first part having a first surface and a second part having a second surface, the first surface including an inwardly-extending corner and an outwardly-extending corner having a first chamfer, the second surface including an inwardly-extending corner and an outwardly-extending corner having a second chamfer, comprising:

applying a bead of braze filler at each of the first chamfer and the second chamfer;

assembling the first surface and the second surface to define a shiplap interface therebetween, the shiplap interface including a first terminus, a second terminus, a first cavity defined between the first chamfer of the first surface and the inwardly-extending corner of the second surface, and a second cavity defined between the second chamfer of the second surface and the inwardly-extending corner of the first surface wherein the termini are located away from the cavities;

melting each of the beads of braze filler to a braze liquid;

allowing the braze liquid to flow through the shiplap interface from the first cavity towards the first terminus, and from the second cavity towards the second terminus; and allowing the braze liquid to cool and harden to provide a brazed joint between the first part and the second part.

16. The method of claim 15, further comprising inspecting braze completeness by monitoring the flow of the braze liquid from the first cavity and the second cavity to the first terminus and the second terminus, respectively.

* * * * *